(12) United States Patent
Gartner

(10) Patent No.: US 8,842,813 B2
(45) Date of Patent: Sep. 23, 2014

(54) TELECONFERENCING MONITORING METHOD

(75) Inventor: Jeffrey G. Gartner, Hopewell Junction, NY (US)

(73) Assignee: Avaya Inc., Basking Ridge, NJ (US)

( * ) Notice: Subject to any disclaimer, the term of this patent is extended or adjusted under 35 U.S.C. 154(b) by 1572 days.

(21) Appl. No.: 12/389,240

(22) Filed: Feb. 19, 2009

(65) Prior Publication Data

US 2010/0208880 A1      Aug. 19, 2010

(51) Int. Cl.
*H04M 3/56* (2006.01)
*H04M 1/00* (2006.01)
*H04L 12/18* (2006.01)

(52) U.S. Cl.
CPC ............ *H04M 3/56* (2013.01); *H04L 12/1818* (2013.01); *H04M 2201/18* (2013.01)
USPC ........................ 379/202.01; 370/260; 379/158

(58) Field of Classification Search
USPC .............................. 379/202.01, 158; 370/260
See application file for complete search history.

(56) References Cited

U.S. PATENT DOCUMENTS

| | | | |
|---|---|---|---|
| 2002/0099698 A1* | 7/2002 | Abe et al. ........................ | 707/3 |
| 2002/0172341 A1* | 11/2002 | Wellner et al. ........... | 379/202.01 |
| 2004/0125932 A1 | 7/2004 | Orbach et al. | |
| 2005/0050061 A1* | 3/2005 | Karstens ....................... | 707/100 |
| 2006/0149815 A1 | 7/2006 | Spradling et al. | |
| 2007/0124458 A1* | 5/2007 | Kumar ........................ | 709/224 |
| 2007/0127645 A1 | 6/2007 | Bloebaum et al. | |
| 2007/0265903 A1* | 11/2007 | Blair et al. ....................... | 705/9 |
| 2008/0167005 A1* | 7/2008 | Gilzean et al. ............. | 455/412.2 |
| 2008/0319750 A1* | 12/2008 | Potter et al. .................... | 704/255 |
| 2009/0225971 A1* | 9/2009 | Miller et al. ............. | 379/202.01 |

OTHER PUBLICATIONS

"http://en.wikipedia.org/wiki/Conference_Call", "Wikipedia", Feb. 25, 2009, Publisher: Wikimedia Foundation, Inc., Published in: US.
"http://en.wikipedia.org/wiki/Web_conferencing", "Wikipedia", Feb. 25, 2009, Publisher: Wikimedia Foundation, Inc., Published in: US.

* cited by examiner

*Primary Examiner* — Fan Tsang
*Assistant Examiner* — Jirapon Intavong
(74) *Attorney, Agent, or Firm* — Maldjian Law Group LLC; John Maldjian; Alexander D. Walter

(57) ABSTRACT

A method that allows a user to have his or her telecommunications terminal automatically monitor one or more teleconferences so that he or she participates in the relevant portions of a teleconference without the disadvantages associated with the prior art is described. The illustrative embodiment teaches a method that can monitor one or more teleconferences and determines when there is a discussion that is relevant to the user. At that point, the user is automatically joined to the teleconference bridge where the teleconference is taking place.

18 Claims, 6 Drawing Sheets ated with the operation of task 302-1 in accordance with the illustrative embodiment of the present invention.

TELECONFERENCING MONITORING METHOD

FIELD OF THE INVENTION

The present invention relates to telecommunications in general, and, more particularly, to teleconferencing.

BACKGROUND OF THE INVENTION

Teleconferencing is a meeting between two or more participants that are not at the same place at the same time. Teleconferencing is a low-cost alternative to getting large groups of people in a single place at the same time for the purpose of having a meeting. The best known example of a teleconference is a conference call with more than two people participating in the call. These teleconferences can have upwards of several hundred people and can last for several hours. Getting these several hundred people in the same place at the same time is simply cost prohibitive.

Often, only a portion of a teleconference is useful to a user. Because teleconferences can last for hours at a time, it is wasteful for a user to wait for the small portion of the teleconference that applies to him or her.

Very often there are many teleconferences happening simultaneously, and a user may wish to participate in a portion of more than one. For instance, with reference to FIG. 2, a user may be interested in Bananas and X-Ray technology. Participating in two conferences simultaneously is not practical, as a user can only listen to one teleconference at a time. Having two conferences open is wasteful of bandwidth on a network.

SUMMARY OF THE INVENTION

The present invention allows a user to have his or her telecommunications terminal automatically monitor one or more teleconferences so that he or she participates in the relevant portions of a teleconference without the disadvantages associated with the prior art.

The present invention is a method that can automatically monitor one or more teleconferences and determines when there is a discussion that may be relevant to the user. At that point, the user is alerted to join or automatically joined to the teleconference bridge where the teleconference is taking place.

Again, with reference to FIG. 2, the illustrative embodiment of the present invention automatically alerts the user, who is interested in Bananas and X-Ray, to teleconference bridge 103-1 at 2:03 and then to teleconference bridge 103-2 at 4:09. Alternatively, the user is automatically joined to joined teleconference bridge 103-1 at 2:03 and then to teleconference bridge 103-2 at 4:09.

DETAILED DESCRIPTION

Figure 1:
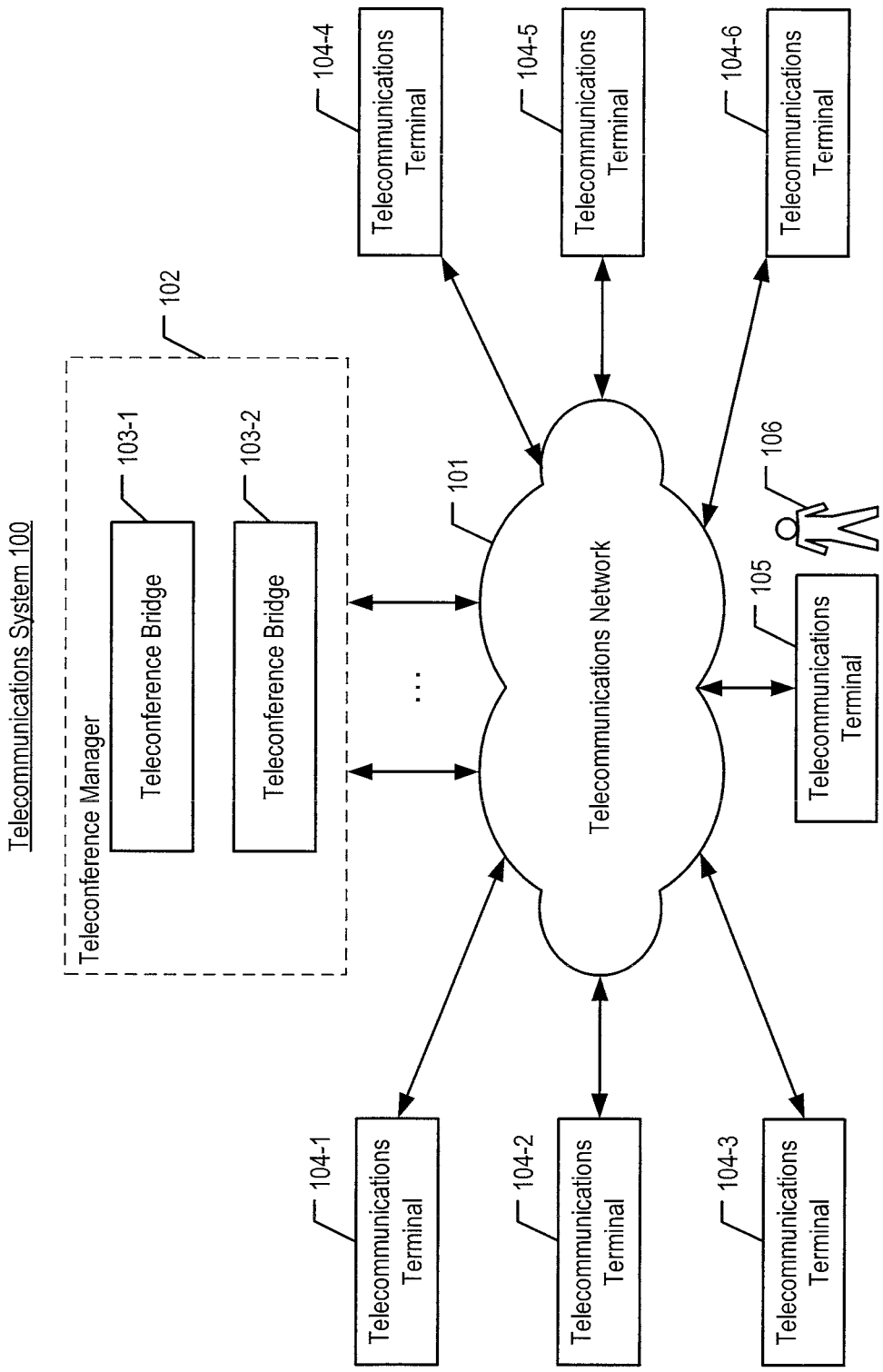
FIG. 1 depicts a schematic diagram of the salient components of telecommunications system 100 in accordance with the illustrative embodiment of the present invention.

FIG. 1 depicts a schematic diagram of the salient components of telecommunications system 100 in accordance with the illustrative embodiment of the present invention. Telecommunications system 100 comprises: telecommunications network 101, teleconference manager, teleconference bridge 103-1, teleconference bridge 103-2, telecommunications terminal 104-1 through 104-6, telecommunications terminal 105, and user 106. Although the illustrative embodiment comprises one user, it will be clear to those skilled in the art, after reading this disclosure, how to make and use alternative embodiments that comprise any number of users.

Although the illustrative embodiment comprises seven telecommunications terminals, it will be clear to those skilled in the art, after reading this disclosure, how to make and use alternative embodiments that comprise any number of telecommunications terminals.

Although the illustrative embodiment comprises one teleconference manager, it will be clear to those skilled in the art, after reading this disclosure, how to make and use alternative embodiments that comprise any number of teleconference managers.

Although the illustrative embodiment comprises two teleconference bridges, it will be clear to those skilled in the art, after reading this disclosure, how to make and use alternative embodiments that comprise any number of teleconference bridges.

In accordance with the illustrative embodiment, telecommunications network 101 is the Public Switched Telephone Network, but it will be clear to those skilled in the art, after reading this disclosure, how to make and use alternative embodiments of the present invention in which telecommunication network 102 is another network or combination of networks, for example and without limitation, the Internet, a private data network, a private branch exchange, a satellite network, etc.

Teleconference manager 102 is hardware and software for receiving and coordinating multiple teleconferences between telecommunications terminals 104-1 through 104-6, telecommunications terminal 105 and their associated users, including user 106. In particular, teleconference manager 102 is capable of performing the functionality described below and with respect to FIG. 2.

Teleconference bridge 103-1 and teleconference bridge 103-2 hardware and software associated with teleconference manager 102. Teleconference bridge 103-1 and teleconference bridge 103-2 are where multiple telecommunications terminals connect with one another through telecommunications network 101 in order to communicate with one another without having to travel distances. At designated times, teleconference manager 102 can set up one or more teleconference bridges to allow multiple telecommunications terminals to connect to one another. These teleconference bridges can host teleconferences with as few as three people and there is no pre-set upper limit on the number of participants in a conference.

It will be clear to those skilled in the art, after reading this disclosure how to make and use teleconference bridge 103-1 and teleconference bridge 103-2.

In accordance with the illustrative embodiment of the present invention, telecommunications terminal 104-1 through telecommunications terminal 104-6 and telecommunications terminal 105 are telephones, it will be clear to those skilled in the art how to make and use telecommunications system 100 utilizing, for example and without limitation, mobile telecommunications terminals such as mobile telephones, private branch exchange extensions, personal computers, or any device capable of connecting to telecommunications network 101.

Although the illustrative embodiment is directed at audio teleconferences, it will be clear to those skilled in the art, after reading this disclosure, how to make and use alternative embodiments of the present invention in which the medium is another medium of combination of media, for example and without limitation, video or text.

Figure 2:
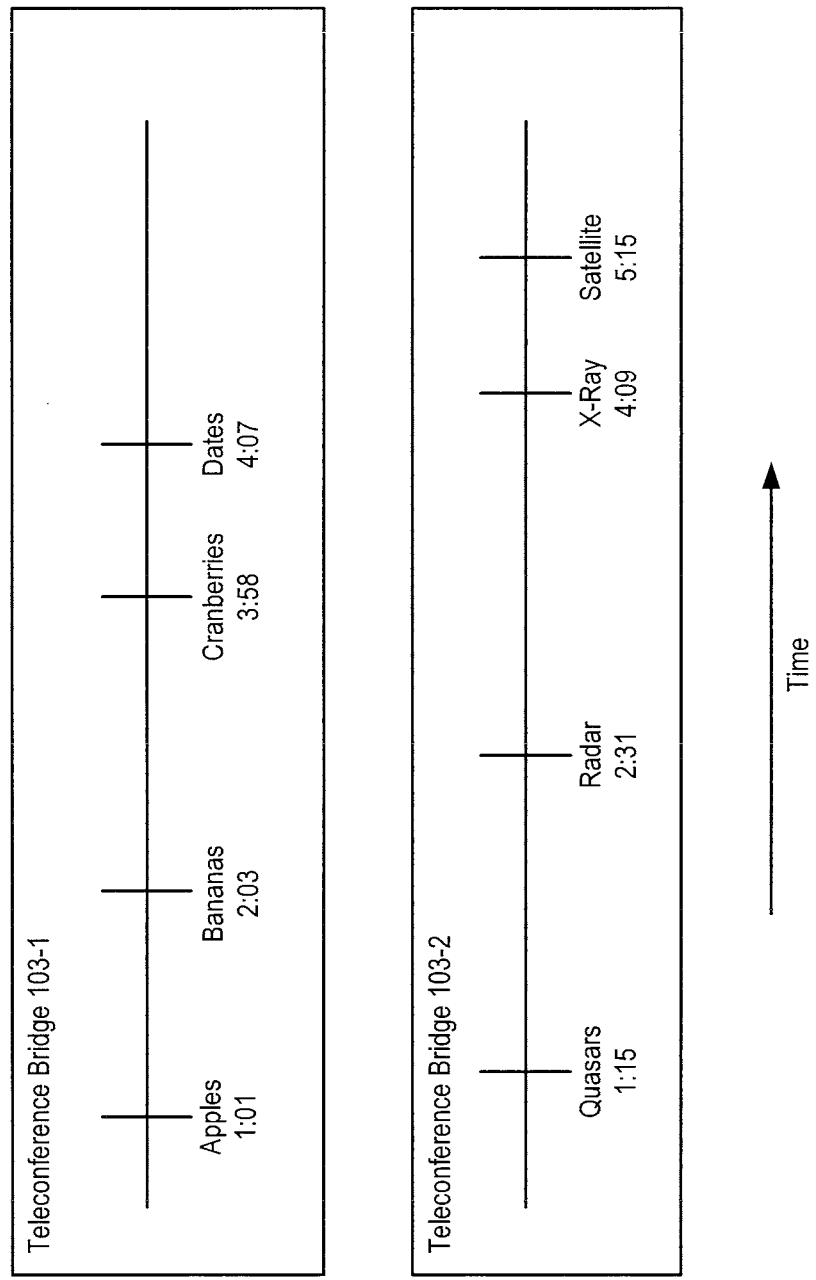
FIG. 2 is a schematic diagram of the contents of teleconference bridge 103-1 and teleconference bridge 103-2.

FIG. 2 is a schematic diagram of the contents of teleconference bridge 103-1 and teleconference bridge 103-2. Teleconference bridge 103-1 comprises four subjects at four times, namely Apples at 1:01, Bananas at 2:03, Cranberries at 3:58, and Dates at 4:07. Teleconference bridge 103-2 comprises four subjects at four times, namely Quasars at 1:15, Radar at 2:31, X-Ray at 4:09, and Satellite at 5:15.

Although the illustrative embodiment comprises four subjects and four times in each teleconference bridge, it will be clear to those skilled in the art, after reading this disclosure, how to make and use alternative embodiments that comprise any number of subjects and times. In any case, it will be clear to one skilled in the art, after reading this disclosure how to make and use teleconference bridge 103-1 and teleconference bridge 103-2.

It will also be clear to one skilled in the art, after reading this disclosure, how to make and use alternative embodiments of the present invention in which user 106 will switch back and forth between teleconference bridge 103-1 and teleconference bridge 103-2.

Figure 3:
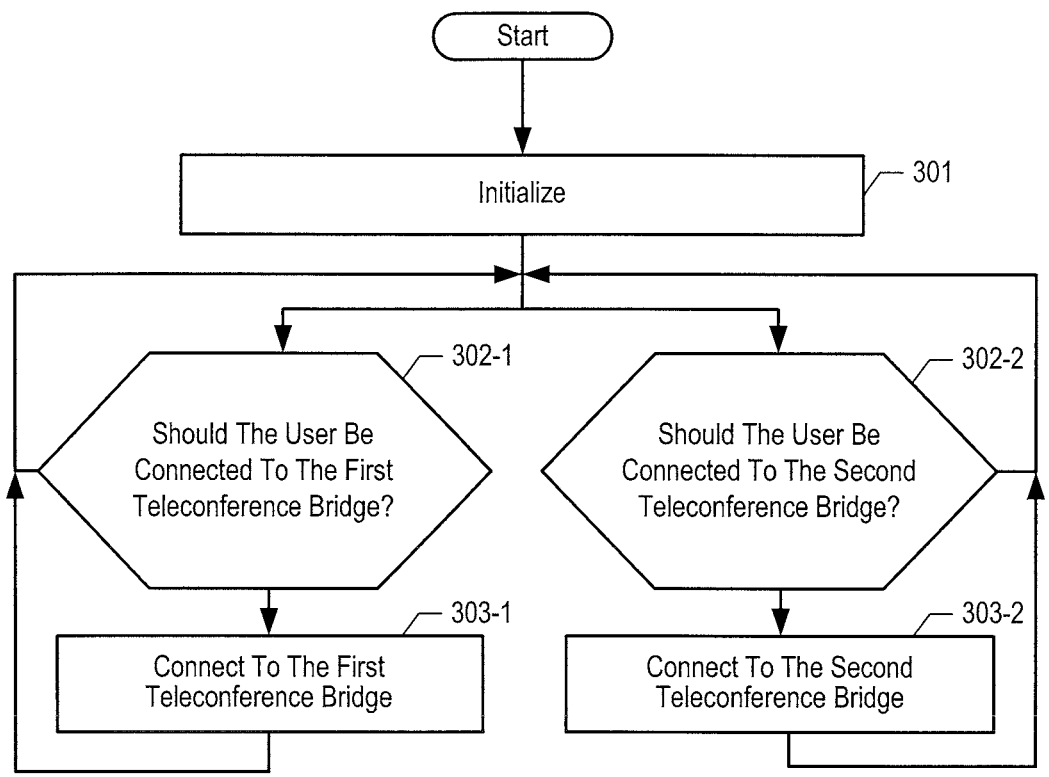
FIG. 3 depicts a flowchart of the salient tasks associated with the operation of the illustrative embodiment of the present invention.

FIG. 3 depicts a flowchart of the salient tasks associated with the operation of the illustrative embodiment of the present invention.

At task 301, the system is initialized and telecommunications terminal 105 receives information from user 106 and from teleconference manager 102.

At task 302-1 telecommunications terminal 105 determines whether or not user 106 should be connected to teleconference bridge 103-1.

At task 302-2 telecommunications terminal 105 determines whether or not user 106 should be connected to teleconference bridge 103-2.

At task 303-1 telecommunications terminal 105 connects to teleconference bridge 103-1.

At task 303-2 telecommunications terminal 105 connects to teleconference bridge 103-2.

It will be clear to one skilled in the art, after reading this disclosure how to make and use other implementations of the present invention in which the steps are performed by teleconference manager 102 instead of telecommunications terminal 105.

It will be clear to one skilled in the art, after reading this disclosure how to make and use other implementations of the present invention in which one or more of the steps are omitted or are performed in a different order than the one presented or simultaneously.

Figure 4:
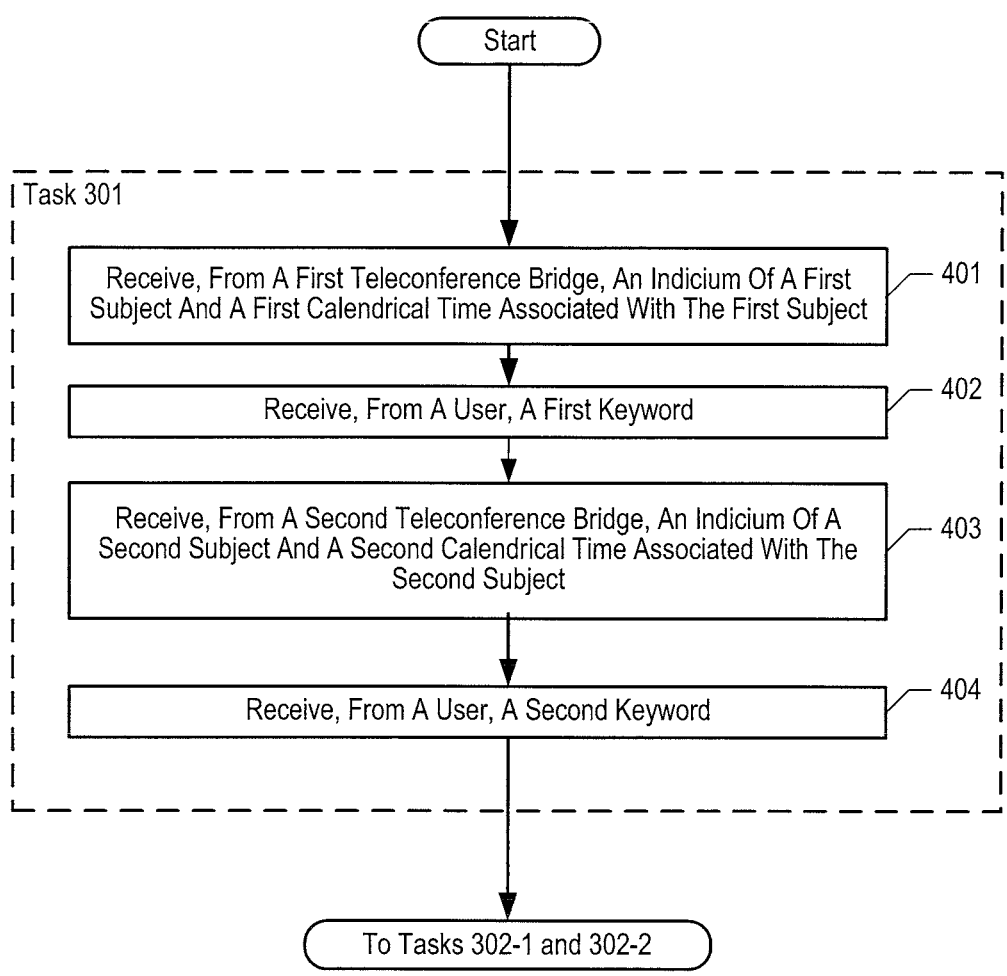
FIG. 4 depicts a flowchart of the salient tasks associated with the operation of task 301 in accordance with the illustrative embodiment of the present invention.

FIG. 4 depicts a flowchart of the salient tasks associated with the operation of task 301 in accordance with the illustrative embodiment of the present invention.

At task 401, telecommunications terminal 105 receives, from a teleconference bridge 103-1, an indicium of a first subject and a first calendrical time associated with the first subject.

At task 402, telecommunications terminal 105 receives, from user 106, a first keyword.

At task 403, telecommunications terminal 105 receives, from a teleconference bridge 103-2, an indicium of a second subject and a second calendrical time associated with the second subject.

At task 404, telecommunications terminal 105 receives, from user 106, a second keyword.

It will be clear to one skilled in the art, after reading this disclosure how to make and use other implementations of the present invention in which one or more of the steps are omitted or are performed in a different order than the one presented or simultaneously.

Figure 5:
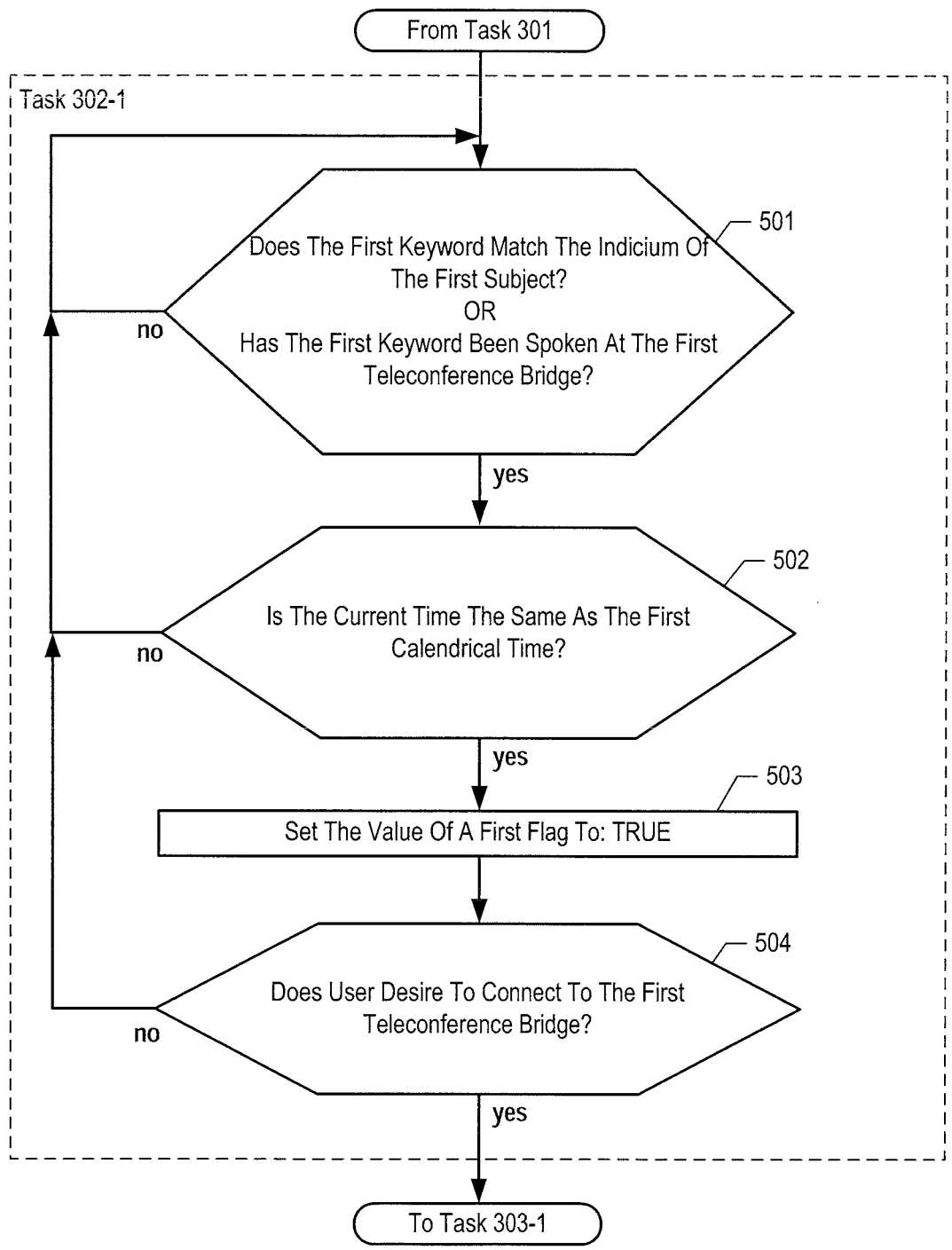
FIG. 5 depicts a flowchart of the salient tasks associated with the operation of task 302-1 in accordance with the illustrative embodiment of the present invention.

FIG. 5 depicts a flowchart of the salient tasks associated with the operation of task 302-1 in accordance with the illustrative embodiment of the present invention.

At task 501, telecommunications terminal 105 determines, whether the first keyword matches the indicium of the first subject or whether the first keyword been spoken at the teleconference bridge 103-1.

At task 502, telecommunications terminal 105 determines, whether the current time the same as the first calendrical time.

At task 503, telecommunications terminal 105 sets the value of a flag to: TRUE.

At task 504, telecommunications terminal 105 determines, whether user 106 desires to connect to teleconference bridge 103-1. In accordance with the illustrative embodiment of the present invention, task 504 can be accomplished by, for example and without limitation, receiving input from the user indicating a desire to connect to teleconference bridge 103-1.

It will be clear to one skilled in the art, after reading this disclosure how to make and use other implementations of the present invention in which the steps are performed by teleconference manager 102 instead of telecommunications terminal 105.

It will be clear to one skilled in the art, after reading this disclosure how to make and use other implementations of the present invention in which one or more of the steps are omitted or are performed in a different order than the one presented or simultaneously.

It will also be clear to one skilled in the art, after reading this disclosure, that the tasks associated with 302-1 are fundamentally the same as those associated with task 302-2.

Figure 6:
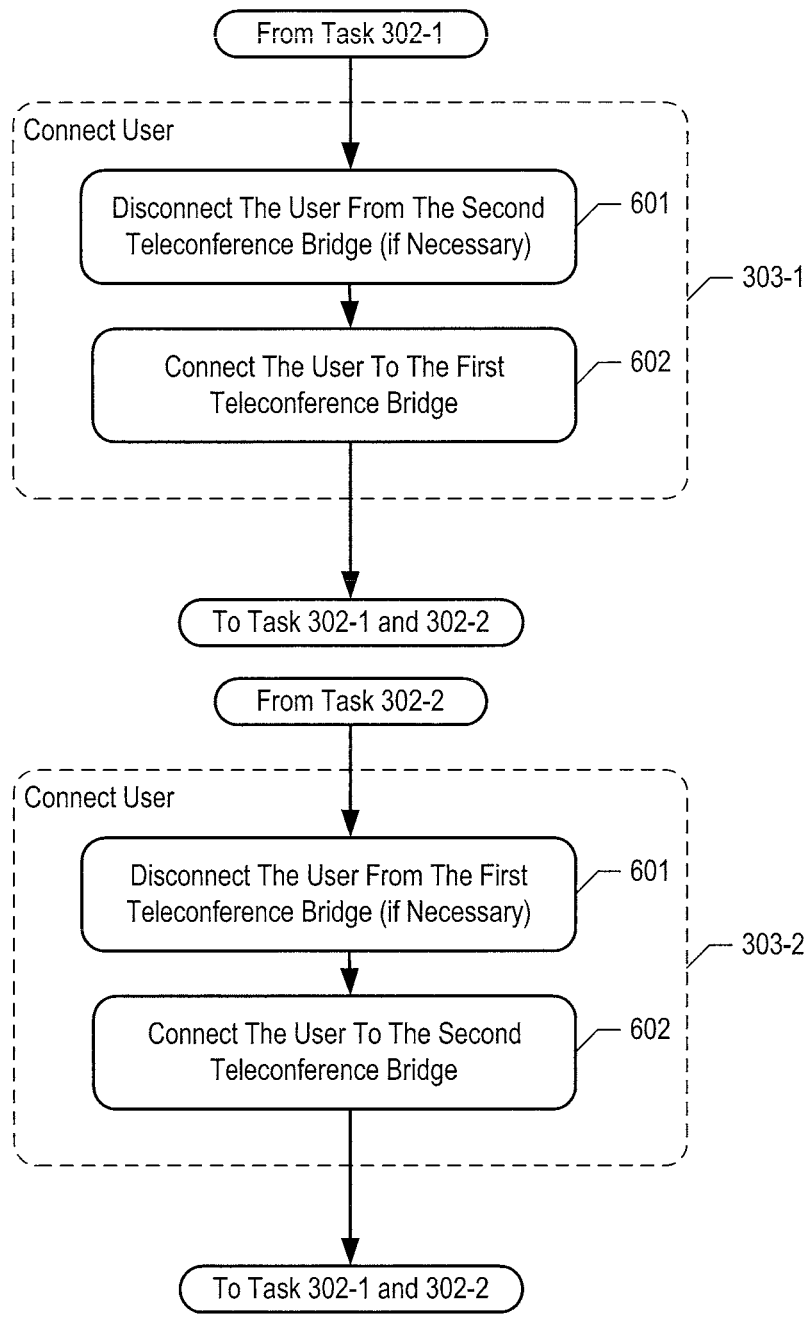
FIG. 6 depicts a flowchart of the salient tasks associated with the operation of task 303-1 and task 303-2 in accordance with the illustrative embodiment of the present invention.

FIG. 6 depicts a flowchart of the salient tasks associated with the operation of task 303-1 and task 303-2 in accordance with the illustrative embodiment of the present invention.

At task 601 (in 303-1), telecommunications terminal 105, determines if user 106 is connected to teleconference bridge 103-2, and will disconnect user 106 if necessary.

At task 602 (in 303-1), telecommunications terminal 105 connects user 106 to teleconference bridge 103-1.

At task 601 (in 303-2), telecommunications terminal 105, determines if user 106 is connected to teleconference bridge 103-1, and will disconnect user 106 if necessary.

At task 602 (in 303-1), telecommunications terminal 105 connects user 106 to teleconference bridge 103-2.

It will be clear to one skilled in the art, after reading this disclosure how to make and use other implementations of the present invention in which one or more of the steps are omitted or are performed in a different order than the one presented or simultaneously.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method, comprising:
   receiving, at a telecommunications terminal, an indicium of a first subject and a first calendrical time associated with the first subject, wherein the inidicium of the first subject and the first calendrical time are associated with a first telephonic bridge;
   receiving, at the telecommunications terminal, a first keyword;
   matching, by the telecommunications terminal, the first keyword to the indicium of the first subject;
   generating, using the telecommunications terminal, a first connection to the first teleconference bridge at the first calendrical time when the first keyword matches the indicium of the first subject;
   receiving, at the telecommunications terminal, an indicium of a second subject and a second calendrical time associated with the second subject wherein the inidicium of the second subject and the second calendrical time are associated with a second telephonic bridge;
   receiving, at the telecommunications terminal, a second keyword;
   matching, by the telecommunications terminal, the second keyword to the indicium of the second subject;
   disconnecting from the first teleconference bridge at the second calendrical time when the second keyword matches the indicium of the second subject; and
   generating, using the telecommunications terminal, a second connection to the second telephonic bridge.

2. The method of claim 1 wherein the indicium of the first subject and the indicium of the second subject are the same.

3. The method of claim 1 wherein the indicium of the first subject and the indicium of the second subject are different.

4. The method of claim 1 wherein the first teleconference bridge and second teleconference bridge are different sources.

5. The method of claim 1 wherein the first teleconference bridge and second teleconference bridge are the same source.

6. A method comprising:
   receiving, at a telecommunications terminal, an indicium of a first subject, wherein the indicium is associated with a first telephonic bridge;
   receiving, at the telecommunications terminal, a first keyword;
   matching, by the telecommunications terminal, the first keyword to the indicium of the first subject;
   setting, using the telecommunications terminal, the value of a first flag to TRUE, when the first keyword matches the indicium of the first subject;
   when the value of the first flag is TRUE, determining, using the telecommunications terminal, whether the user desires to connect to the first teleconference bridge;
   generating, using the telecommunications terminal, a first connection to the first teleconference bridge based on the determination of whether the user desires to connect to the first teleconference bridge;
   receiving, at the telecommunications terminal, an indicium of a second subject, wherein the indicium is associated with a second teleconference bridge;
   matching, by the telecommunications terminal, the first keyword to the indicium of the second subject;
   setting, using the telecommunications terminal, the value of a second flag to TRUE, when the first keyword matches indicium of the second subject;
   when the value of the second flag is TRUE, determining, using the telecommunications terminal, whether the user desires to connect to the second teleconference bridge; and
   disconnecting from the first teleconference bridge based on the determination of whether the user desires to connect to the second teleconference bridge.

7. The method of claim 6 wherein the indicium of the first subject is received via an XML format.

8. The method of claim 7 wherein the indicium of the first subject is received via Atom.

9. The method of claim 6 wherein the indicium of the first subject is received via RSS.

10. The method of claim 6 further comprising:
    when the value of the second flag is TRUE, generating, using the telecommunications terminal, a second connection to the second teleconference bridge.

11. The method of claim 6 further comprising:
    setting, using the telecommunications terminal, the value of the second flag to TRUE when a participant at the second teleconference bridge uses the first keyword;
    when the value of the second flag is TRUE, determining, using the telecommunications terminal, whether the user desires to connect to the second teleconference bridge.

12. The method of claim 6 further comprising:
    receiving a second keyword from the user;
    setting, using the telecommunications terminal, the value of the second flag to TRUE when a participant at the second teleconference bridge uses the second keyword; and
    when the value of the second flag is TRUE determining, using the telecommunications terminal, whether the user desires to connect to the second teleconference bridge.

13. The method of claim 6 further comprising:
    receiving an indicium of a second subject, wherein the second subject is associated with the second teleconference bridge;
    setting, using the telecommunications terminal, the value of the second flag to TRUE at a calendrical time when the second subject matches the first keyword; and
    when the value of the second flag is TRUE, determining, using the telecommunications terminal, whether the user desires to connect to the second teleconference bridge.

14. A method comprising:
    generating, using a telecommunications terminal, a first connection to a first telephonic bridge, the first connection associated with an indicium of a first subject and a first calendrical time associated with the first subject;
    receiving, at the telecommunications terminal, an indicium of a second subject and a second calendrical time associated with the second subject, wherein the indicium of the second subject and the second calendrical time are associated with a second telephonic bridge;
    receiving, at the telecommunications terminal, a keyword;
    disconnecting, by the telecommunications terminal, from the first teleconference bridge at the second calendrical time based on both the keyword and the indicium of the second subject; and
    generating, using the telecommunications terminal, a second connection to the second telephonic bridge.

15. The method of claim 14 wherein the indicium of the first subject and the indicium of the second subject are the same.

16. The method of claim 14 wherein the indicium of the first subject and the indicium of the second subject are different.

17. The method of claim 14 wherein the first teleconference bridge and second teleconference bridge are different sources.

18. The method of claim 14 wherein the first teleconference bridge and second teleconference bridge are the same source.

* * * * *